US008879231B2

United States Patent
Katzschmann et al.

(10) Patent No.: US 8,879,231 B2
(45) Date of Patent: Nov. 4, 2014

(54) METHOD AND ARRANGEMENT FOR THE SENSORLESS OPERATION OF MAGNETIC BEARINGS

(75) Inventors: Michael Katzschmann, Ilmenau (DE); Peter Kornetzky, Ilmenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1002 days.

(21) Appl. No.: 12/671,326

(22) PCT Filed: Jul. 19, 2008

(86) PCT No.: PCT/DE2008/001190
§ 371 (c)(1),
(2), (4) Date: Sep. 21, 2010

(87) PCT Pub. No.: WO2009/015639
PCT Pub. Date: Feb. 5, 2009

(65) Prior Publication Data
US 2011/0038091 A1    Feb. 17, 2011

(30) Foreign Application Priority Data

Jul. 30, 2007 (DE) .......................... 10 2007 035 677
Feb. 5, 2008 (DE) .......................... 10 2008 007 512

(51) Int. Cl.
*H01H 47/00* (2006.01)
*F16C 32/04* (2006.01)

(52) U.S. Cl.
CPC .................................. *F16C 32/0448* (2013.01)
USPC ....................................................... 361/144

(58) Field of Classification Search
USPC .................. 361/143, 144; 310/90.5
See application file for complete search history.

(56) References Cited

U.S. PATENT DOCUMENTS

| 4,652,820 | A | 3/1987 | Maresca |
| 5,300,841 | A | 4/1994 | Preston et al. |
| 5,696,412 | A | 12/1997 | Iannello |
| 5,844,339 | A | 12/1998 | Schroeder et al. |
| 7,206,180 | B2 * | 4/2007 | Kuehn et al. ................... 361/152 |
| 7,610,029 | B2 * | 10/2009 | Li ............................... 455/232.1 |
| 7,830,056 | B2 * | 11/2010 | Barada et al. ................ 310/90.5 |
| 2006/0227860 | A1 | 10/2006 | Leung et al. |
| 2009/0040666 | A1 * | 2/2009 | Elms et al. ....................... 361/42 |

FOREIGN PATENT DOCUMENTS

| DE | 39 37 687 A | 5/1990 |
| EP | 0 632 209 A | 1/1995 |
| JP | 07 071456 A | 3/1995 |
| WO | 2004/027529 A | 4/2004 |
| WO | WO 2007004656 A1 * | 1/2007 |

* cited by examiner

*Primary Examiner* — Jared Fureman
*Assistant Examiner* — Christopher Clark
(74) *Attorney, Agent, or Firm* — Simpson & Simpson, PLLC

(57) ABSTRACT

A sensor system for a magnetic bearing, which has two actuator coils, two clocked power output stages, a current sensor for detecting those currents in the actuator coils which are encumbered with a ripple current, and a sensor interface. The clocked power output stages provide a pulse-width-modulated output voltage, the pulse width of which is narrowed or widened by small amounts in a predefined order, and the pulse widths of the clocked power output stages are modulated in a fixed phase relationship with respect to one another. The sensor system specifies a sensor system for a magnetic bearing with a clocked power output stage. A magnetic bearing, a control device for a magnetic bearing and a method for detecting the position in a magnetic bearing are also disclosed.

18 Claims, 3 Drawing Sheets

METHOD AND ARRANGEMENT FOR THE SENSORLESS OPERATION OF MAGNETIC BEARINGS

This application is a 371 of PCT/DE2008/001190 filed Jul. 19, 2008, which in turn claims the priority of DE 10 2007 035 677.5 filed Jul. 30, 2007, and DE 10 2008 007 512.4 filed Feb. 5, 2008, the priority of these applications is hereby claimed and these applications are incorporated by reference herein.

BACKGROUND OF THE INVENTION

1. Field of the Invention

The invention relates to a sensor system as claimed in claim 1 for a magnetic bearing, to a regulation device as claimed in claim 10 for a magnetic bearing, a magnetic bearing as claimed in claim 14, and a method as claimed in claim 15.

2. Description of Related Art

Magnetic bearings are used for contactless guidance and mounting of moving parts such as rotors of motors or impellers of pumps. The lack of touching mechanical contact makes it possible, inter alia, to optimize friction losses, to reduce wear and to avoid the generation of particles. Major components of a magnetic bearing are:

1. An actuator system which comprises one or more electromagnets,
2. A sensor system, which detects the instantaneous position of the object to be mounted and allows regulation at a nominal position, and
3. Electrical components for signal detection, regulation and for control of power flows.

In general, the sensor system is an assembly which is rigidly coupled to and additionally fitted to the actuator system. In order to optimize the physical size of the magnetic bearing, it is desirable for the sensor system to occupy only a small amount of space, or even to allow this to be dispensed with completely. The use of the effect that the impedance of the actuator coils of the actuator system changes as a function of the position allows the actuator system, which is required in any case, with the actuator coils also to carry out the function of the position sensor. Corresponding technical solutions have already been described in the patent literature. In this case, inter alia, the following principles of operation are used:

determination of the impedance of the actuator coil by means of a high-frequency bridge circuit, and comparison with a reference inductance or a further actuator coil for the same magnetic bearing axis (DE 4210741I), addition modulation of a sinusoidal alternating current onto the current through the actuator coils, and detection and filtering of the resultant position-dependent voltage (EP 0749538).

With both principles of operation, disadvantages can be expected when they are combined with clocked power output stages, which are often used for applications of this type, because of their low heat losses and small physical size.

BRIEF SUMMARY OF THE INVENTION

The object of the invention is to specify a sensor system for a magnetic bearing having a clocked power output stage.

According to the invention, this object is achieved by a sensor system as claimed in claim 1 for a regulation device as claimed in claim 10 for a magnetic bearing as claimed in claim 14, and by a method as claimed in claim 15.

The defined pulse-width modulation allows simple detection of the position in a magnetic bearing system which is equipped with a clocked output stage. This detection is essentially independent of the mean duty ratio of the clocked excitation of the two actuator coils.

The predetermined sequence preferably consists in that the pulse width of successive pulses is in each case alternately lengthened or shortened by a small amount. The pulse width of successive pulses can be shortened or lengthened alternately, such that the pulse-width-modulated excitation is at twice the clock frequency. It is self-evident that it is also possible to provide other multiples of the clock frequency for clocking the clock output stages, instead of twice the clock frequency. In particular, the clocking for the sensor system may be derived from clocking of a superordinate unit in which the sensor system is included, specifically from the system clock of the regulation unit.

The difference between the ripple current in the actuator coils is preferably detected by the at least one current sensor.

Particularly with regard to the configuration of the current sensor, an inductive sensor in the form of a current transformer is preferably used as the current sensor for detection of the difference between the ripple currents in the actuator coils. This inductive sensor may comprise two coils in opposite senses, which surround a core, with each coil being associated with one of the two actuator coils. Residual magnetization is created depending on the current in the coils, and is detected, and its occurrence can indicate a discrepancy of the inductances of the actuator coils. In particular, it is possible to detect the difference between two or more actuator coils by means of a single inductive current sensor, which produces a difference signal as an output.

Alternatively or in addition to this, with regard to the configuration of the current sensor, a current transformer with capacitors and resistors is provided as the current sensor and is connected such that a resonant circuit is formed, which is tuned to the frequency at which the sequence of predetermined modulation of the pulse width is repeated. The capacitors, resistors and inductances which form the resonant circuit represent passive components which do not have any significant disturbing influence on other components within the sensor system and within the regulation unit.

The signal from the current sensor is preferably mathematically linked in the sensor interface, and in particular is supplied to a rectifier circuit which operates synchronized to the time profile of the predetermined sequence of the modulation of the pulse width. The mathematical links may comprise sum and difference formation, rectification by mathematical multiplication by a stepper function using the same clock as the clock for the difference between the ripple currents, in order to correct the mathematical sign of the difference between the ripple currents, thus resulting in rectification whose smoothing, for example by integration over time, produces an essentially constant output voltage which once again corresponds—possibly signed—to the difference between the inductances of the two actuator coils, and therefore to the position of the object to be detected between the two actuator coils.

A time delay, which can be varied in particular by means of a phase shift, is preferably providing between the predetermined sequence of the modulation of the pulse width and the clock of the synchronous rectification.

Components for signal amplification and/or for signal filtering are preferably used either in the signal path of the sensor signal or for the signal after the synchronous rectification, or in both signal paths. The signal amplification or signal filtering modifies the signal for example such that disturbance influences are suppressed, for example discrepancies in the inductances from an ideal behavior, in particular for example such that the current dependency of the inductance can be detected and can be suppressed or compensated for by calculation. This signal processing can be carried out in the signal path between the current sensor and the sensor interface, or in the sensor interface, after the rectification of the difference signal between the two ripple currents in the two actuator coils, or combined in both options.

The position signal obtained from the ripple currents is preferably mathematically linked in a regulation device to further signals in order to obtain from this a signal for controlling the pulse width of said output stages. By way of example, the mathematical linking in the regulation device may comprise matching of the position signal to nominal values in order to determine, for example to calculate, a manipulated variable from this, which the regulation device outputs. The regulation device can control the pulse width of the output stages as a manipulated variable, since the sensor system is essentially independent of the pulse width of the output stages, thus making it possible to avoid coupling between the regulation device and the sensor system.

With regard to the further signals in the regulation device, the further signals are preferably the instantaneous current values in the actuator coils, or their mathematical derivative.

With regard to the regulation device, a common system clock generator is preferably provided for the sensor system and the regulation device, wherein a system clock for the regulation device is synchronized to further assemblies in a superordinate system. The superordinate system may, for example, be a clocked motor which is borne in places in the magnetic bearing.

The embodiment of the sensor system and of the regulation device as described above makes it possible, in particular, to carry out a method for detection of the position in a magnetic bearing, wherein the method comprises the following steps: provision of a pulse-width-modulated output voltage at the power output stages, wherein the pulse width is shortened or lengthened by small amounts in each case in a predetermined sequence, and wherein the pulse widths of the clocked power output stages are modulated with a fixed phase relationship with respect to one another, and detection of the difference between the ripple currents by means of the current sensor. The difference between the ripple currents is the input variable to the regulation device for the magnetic bearing.

Further advantages and features are specified in the dependent claims and have become evident from the description of one preferred exemplary embodiment.

BRIEF DESCRIPTION OF THE DRAWINGS

The invention will be described and explained in more detail in the following text with reference to the attached drawings, in which.

DETAILED DESCRIPTION OF THE PREFERRED EMBODIMENTS

Figure 1:
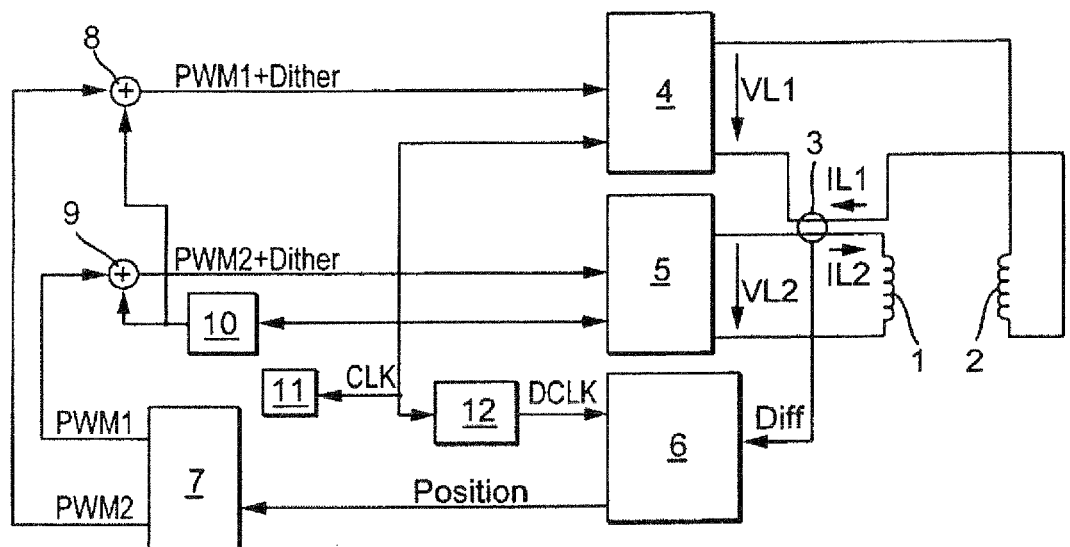
FIG. 1 shows a schematic illustration of a circuit diagram of the individual elements of an exemplary embodiment of a sensor system according to the invention, in an exemplary embodiment of a regulation device according to the invention as an apparatus for, an exemplary implementation of the method according to the invention.

FIG. 1 illustrates an example of the schematic layout of the sensor system according to the invention and of the control device according to the invention for a magnetic bearing according to the invention.

The principle of operation is based on the fact that the inductance of the two actuator coils 1, 2 of the magnetic bearing varies as a function of the position of the mounted body. When each of the actuator coils 1, 2 are controlled with a pulse-width-modulated signal from a clocked power output stage 4, 5, this means that the profile of the ripple current in each of the actuator coils 1, 2 likewise changes.

Figure 2:
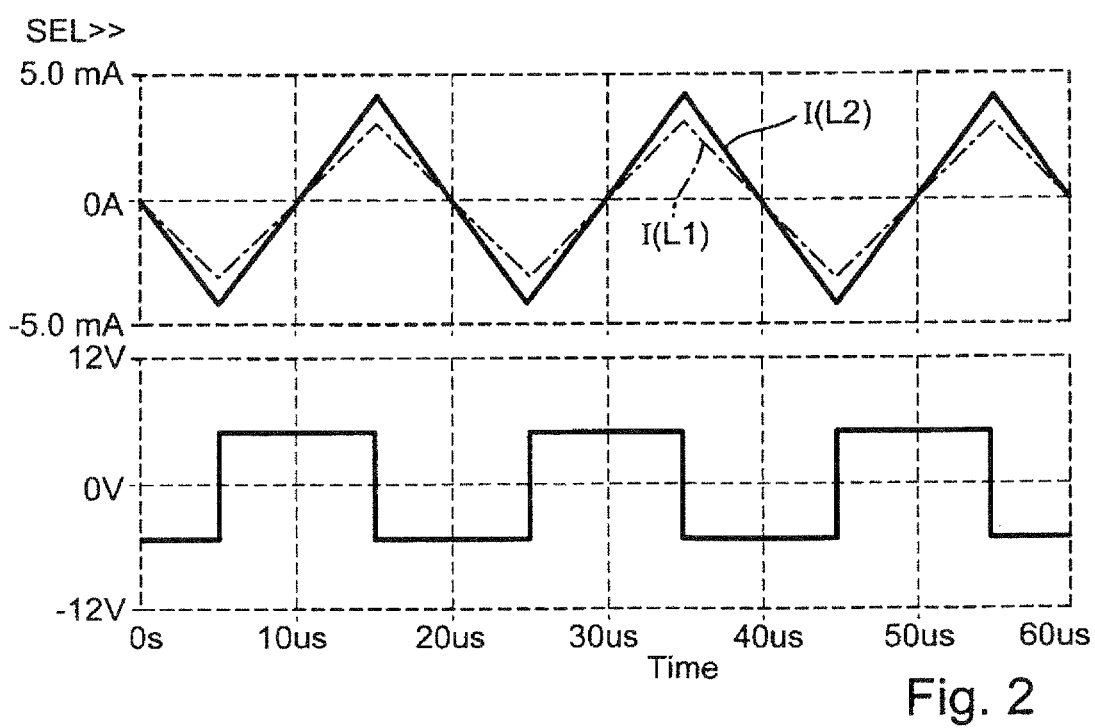
FIG. 2 shows the profile of the ripple currents of two actuator coils to be expected in theory in an exemplary embodiment of a magnetic bearing according to the invention, wherein the two actuator coils have different inductances (upper illustration: L1>L2) for the same excitation in each case (lower illustration)

FIG. 2 shows the theoretical profile of the ripple currents in two actuator coils 1, 2, with the actuator coil 1 having a higher inductance L1 than the actuator coil 2 with the inductance L2. Since the duty ratios of the excitation of the actuator coils 1, 2 generally differ during operation in a magnetic bearing, the simple evaluation of each ripple current cannot be used to assess the inductances.

The duty ratio of successive pulses is thus alternately increased or decreased by a small constant amount (dither), such that the mean duty ratio remains unchanged. Overall, the ripple current through each of the two coils 1, 2 has periodic amplitude modulation which, in the case of ideal inductances L1, L2, is independent of the mean current through the two actuator coils 1, 2, and is likewise independent of the mean duty ratio.

Figure 3:
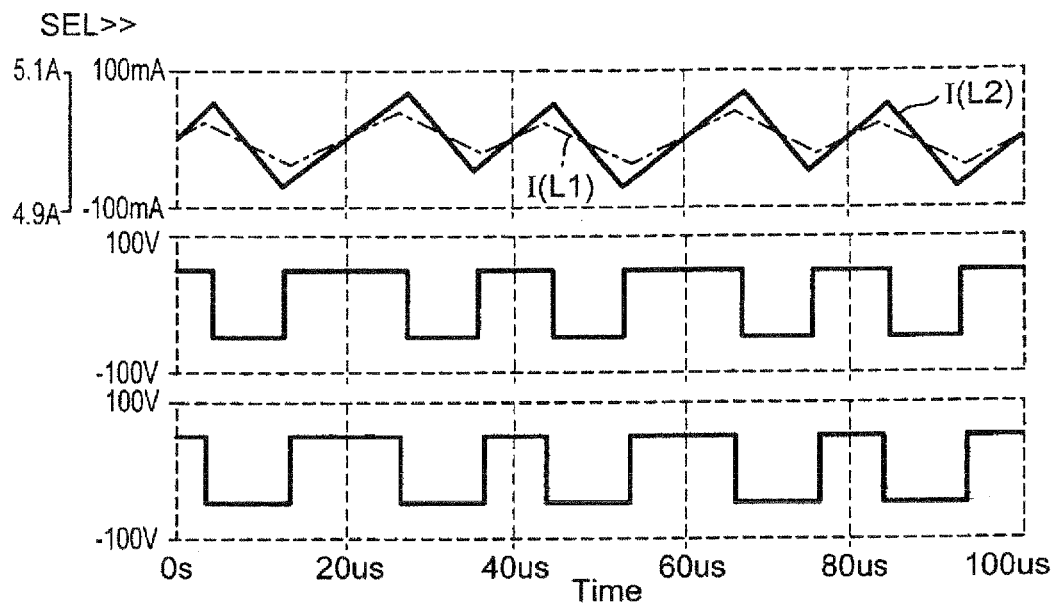
FIG. 3 shows the profile of the ripple currents of two actuator coils (upper illustration) to be expected in theory, which are each excited with different duty ratios (central and lower illustration), and which have a different inductance.

FIG. 3 shows the theoretical profiles of the pulse-width-modulated excitation of two actuator coils 1, 2, and the resultant profile of the respective ripple current. Despite different duty ratios of the excitation and different current levels in the two actuator coils 1, 2, the modulation of the amplitude of the ripple current remains the same as the result of the modulation of the duty ratio. In order to evaluate the modulation of the ripple current, a current sensor 3 is fitted in the supply lines to the actuator coils 1, 2, and detects the difference between the two currents. In the simplest case, this current sensor may comprise an inductive current transformer. The difference signal (Diff, FIG. 1) obtained from the current transformer 3 is evaluated in a sensor interface 6. This evaluation includes single-stage or multiple-stage amplification, rectification in synchronism with a clock signal DCLK which is derived from the system clock CLK, and signal-stage or multiple-stage filtering. The frequency of the derived clock signal DCLK is precisely half of that of the system clock CLK provided by the clock generator 11, and is linked via a phase shift 12. The phase shift 12 takes account of the fact that the resultant ripple current naturally has a delay in comparison to the excitation via the duty ratio.

The output signal from the sensor interface 6 carries the information about the instantaneous position of the object which is mounted in the magnetic bearing with the actuator coils 1, 2. The difference signal between the ripple currents in the two actuator coils, possibly after integrated processing of the signal, is compared with the nominal position in the downstream regulation device, and the position discrepancy is processed in a known manner in the regulation device 7. The regulation device 7 uses the position discrepancy and possibly the instantaneous values of the current in the actuator coils 1, 2 as well as further parameters (for example the rotation speed of a rotor, which is mounted between the actuator coils 1, 2, in the magnetic bearing) to determine a mean value for the duty ratio of the clocked power output stages 4, 5. In order to simplify the illustration, the corresponding signal paths have not been illustrated. This duty ratio is then modulated with a dither signal at the two summation points 8, 9. The dither signal is obtained in a dither generator 10 from the system clock CLK, and its frequency is exactly half that of the system clock CLK, possibly with a phase shift. The power output stages 4, 5 are likewise triggered by the system clock, and have a fixed phase relationship with the system clock. In order to avoid disturbances in the system, multiple actuator systems which are combined in one system should also be controlled by the same system clock.

Figure 4:
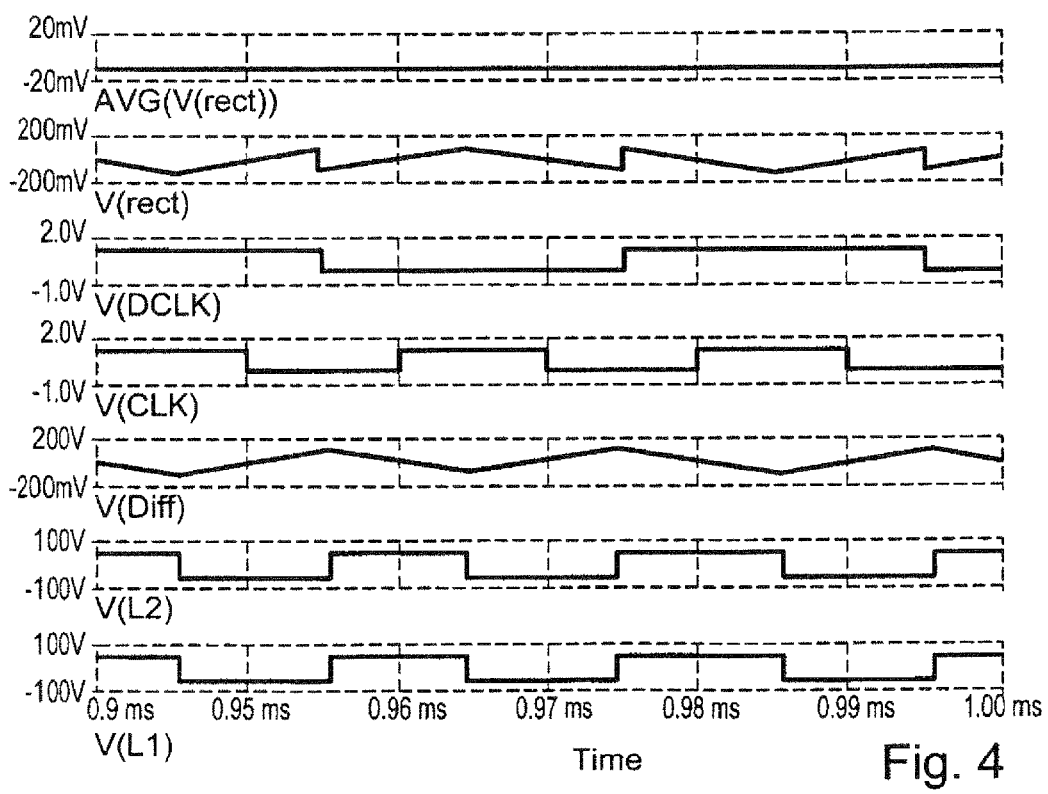
FIG. 4 shows the signal profile at a number of points which govern the function in the schematic illustration as shown in FIG. 1, where L1>L2.
Figure 5:
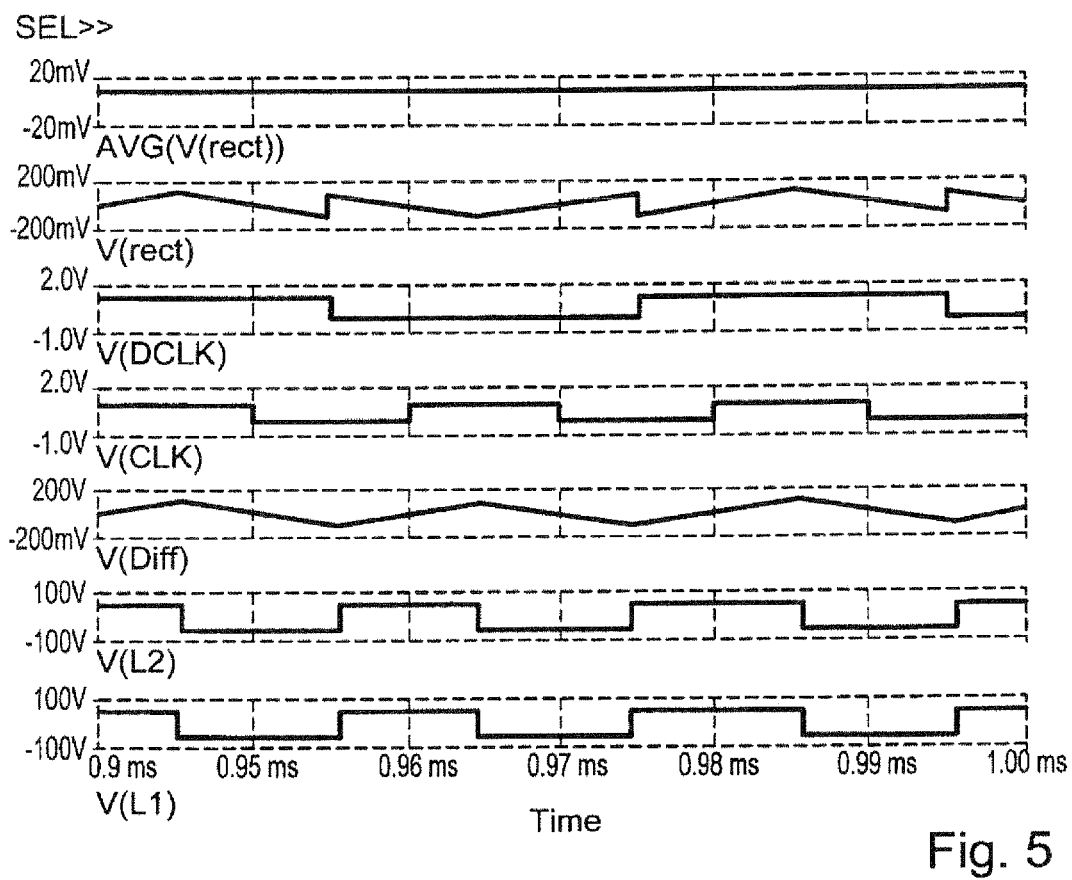
FIG. 5 shows the signal profile at a number of points which govern the function in the schematic illustration as shown in FIG. 1, where L1<L2.

FIGS. 4 and 5 in each case show the resultant theoretical signal profiles for the situation in which the inductances L1, L2 of the actuator coils 1, 2 have assumed different values with respect to one another. In sequence from top to bottom, the profiles are:
  exciting voltage at the first actuator coil 1,
  exciting voltage at the second actuator coil 2,
  output signal from an inductive current sensor 3 which detects the difference current between the two actuator coils 1, 2,
  system clock CLK,
  derived clock signal DCLK, which is set optimally in phase for the present situation,
  profile of the detected current difference signal Diff after synchronous rectification Vrect, and
  unamplified position signal.

Because of the different inductances L1, L2 of the actuator coils 1, 2, the unamplified position signal in FIG. 4 is of negative polarity, and the position signal illustrated in FIG. 5 is of positive polarity, in each case with respect to an offset voltage of 0 volts. Both illustrations are based on the same actuator coils 1, 2 with different inductance L1, L2, which have simply been interchanged with one another. The result (FIG. 4 and FIG. 5, the uppermost part of the figure in each case) is in each case an approximate DC voltage signal, which is signed and indicates where the mounted rotor is arranged with respect to the actuator coils 1, 2.

In the exemplary embodiment described above, for modulation of the pulse width, provision was made for immediately successive pulses each to have a shorter or increased pulse width, as a result of which the modulation has twice the period of the excitation of the actuator coils 1, 2. It is self-evident that three or more different pulse widths can also be provided, as a result of which the modulation may have a greater multiple of the excitation.

The invention has been described and explained in more detail above with reference to an exemplary embodiment, in which the output variable from the sensor interface 6 was the input variable for the regulation device 7. It is self-evident that the output variable from the sensor system can also be evaluated for other purposes.

LIST OF REFERENCE SYMBOLS

1 First actuator coil 1
2 Second actuator coil 2
3 Current sensor
4 Clocked power output stage 1
5 Clocked power output stage 2
6 Sensor interface with correct-phase rectification, amplification and filtering
7 Regulation device
8 Summation point 1
9 Summation point 2
10 Dither generator
11 Clock generator
12 Phase shifter

The invention claimed is:
1. A sensor system for a magnetic bearing, comprising:
two actuator coils;
two clocked power output stages;
a current sensor for detection of currents with a ripple current on them, in the actuator coils; and
a sensor interface, wherein:
  the clocked power output stages each provide a pulse-width-modulated output voltage whose pulse width is shortened or lengthened by small amounts, in a predetermined sequence such that a mean duty ratio of the pulse-width-modulated output voltage remains unchanged;
  pulse widths of the clocked power output stages are modulated with a fixed phase relationship with respect to one another;
  a signal from the current sensor is mathematically linked in the sensor interface, and is supplied to a rectifier circuit which operates synchronized to a time profile of the predetermined sequence of modulation of the pulse width; and,
  a time delay, which can be varied by means of a phase shift, exists between the predetermined sequence of the modulation of the pulse width and a clock of synchronous rectification.

2. The sensor system of claim 1, wherein the predetermined sequence consists of the pulse width of successive pulses, each being alternately lengthened or shortened by a small amount.

3. The sensor system of claim 1, wherein a difference between the ripple current in the actuator coils is detected by the current sensor.

4. The sensor system of claim 3, wherein an inductive sensor in a form of a current transformer is used as the current sensor for detection of the difference between the ripple current in the actuator coils.

5. The sensor system of claim 3, wherein a current transformer with capacitors and resistors is provided as the current sensor and is connected such that a resonant circuit is formed, which is tuned to a frequency at which the sequence of predetermined modulation of the pulse width is repeated.

6. The sensor system of claim 1, wherein components for signal amplification and/or for signal filtering are used either in a signal path of a sensor signal or for a signal after the synchronous rectification, or in both signal paths.

7. The sensor system of claim 1, wherein a position signal obtained from the ripple current is mathematically linked in a regulation device to additional signals in order to obtain a signal for controlling the pulse widths of the power output stages.

8. A regulation device for a magnetic bearing, comprising the sensor system of claim 1.

9. The regulation device of claim 8, wherein a position signal, which is obtained from the ripple current in the actuator coils, is mathematically linked to additional signals in order to obtain a signal for controlling the pulse widths of tile power output stages.

10. The regulation device of claim 9, wherein the additional signals are instantaneous current values in the actuator coils, or their mathematical derivative.

11. The regulation device of claim 10, wherein a common system clock generator is provided for the sensor system and the regulation device, wherein a system clock for the regulation device is synchronized to further assemblies in a superordinate system.

12. A magnetic bearing, comprising the sensor system of claim 1.

13. The regulation device of claim 1, further comprising a dither generator generating the small amounts that the pulse width is shortened or lengthened in the predetermined sequence.

14. A method for position detection in a magnetic bearing, wherein the magnetic bearing comprises: first and second actuator coils; first and second clocked power output stages; and a current sensor for detection of a difference between respective ripple currents in the first and second actuator coils, comprising the following steps:
providing a first pulse-width-modulated output voltage for the first actuator coil at the first clocked power output stage, the first pulse-width-modulated output voltage having a first maximum positive magnitude at a first point in time;
providing a second pulse-width-modulated output voltage for the second actuator coil at the second clocked power output stage, the second pulse-width-modulated output voltage having a second maximum positive magnitude at the first point in time;
wherein first and second pulse widths of the first and second pulse-width-modulated output voltages, respectively, are shortened or lengthened by first and second small amounts, respectively in each case, in a predetermined sequence such that first and second mean duty ratios of the first and second pulse-width-modulated output voltages, respectively remain unchanged, and
wherein the first and second pulse widths of the first and second clocked power output stages are modulated with a fixed phase relationship with respect to one another, and with respect to the detection of the difference between the respective ripple currents by means of the current sensor.

15. The magnetic bearing of claim 12, wherein the sensor system is a regulation device.

16. The method of claim 14, wherein:
the first and second pulse-width-modulated output voltages include first and second minimum negative amplitudes, respectively; and,
the first maximum amplitude and the second negative amplitude are each present at a second same point in time.

17. A sensor system for a magnetic bearing, comprising:
first and second actuator coils;
first and second clocked power output stages;
a current sensor for detection of first and second currents in the first and second actuators, respectively, the first and second currents including first and second ripple currents, respectively; and
a sensor interface, wherein:
the first and second clocked power output stages provide first and second pulse-width-modulated output voltages, respectively;
first and second pulse widths for the first and second pulse-width-modulated output voltages, respectively, are shortened or lengthened by small amounts, in each case, in a predetermined sequence such that first and second mean duty ratios of the first and second pulse-width-modulated output voltages, respectively, remain unchanged; and
the first and second pulse widths of the first and second clocked power output stages are modulated with a fixed phase relationship with respect to one another such that first and second minimum negative amplitudes for the first and second pulse-width-modulated output voltages, respectively, are present at a first same point in time.

18. The method of claim 17, wherein the first and second pulse-width-modulated output voltages include first and second maximum positive amplitudes, respectively, present at a second same point in time.

* * * * *